Figure 1:
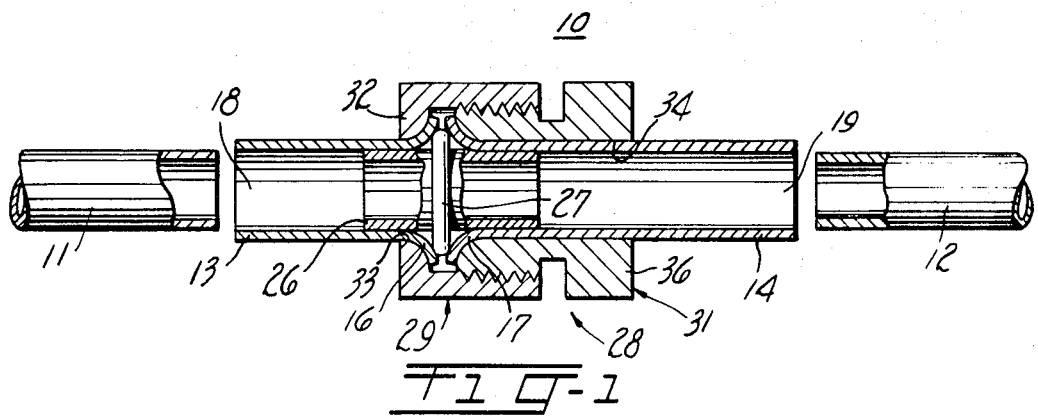

United States Patent

[11] 3,618,987

| [72] | Inventor | Martin R. Carbone<br>Carpinteria, Calif. |
|---|---|---|
| [21] | Appl. No. | 871,643 |
| [22] | Filed | Nov. 5, 1969 |
| [45] | Patented | Nov. 9, 1971 |
| [73] | Assignee | Cajon Company<br>Solon, Ohio<br>Continuation of application Ser. No.<br>698,346, Jan. 16, 1968, now abandoned. |

[54] LEAK-TIGHT COUPLING
6 Claims, 2 Drawing Figs.

[52] U.S. Cl. .................................................. 285/12,
285/334.5, 285/353
[51] Int. Cl. .................................................. F16l 25/00
[50] Field of Search .......................................... 285/334.5,
345, 346, 353, 12, 287, 371, 369, 175, 171, 384,
302, 169, 286

[56] References Cited
UNITED STATES PATENTS

| 748,546 | 12/1903 | Vail | 285/353 X |
| 2,287,142 | 6/1942 | Simmonds | 285/353 X |
| 2,523,578 | 9/1950 | Lewis | 285/353 X |
| 2,691,536 | 10/1954 | Tamminga | 285/354 |
| 2,729,237 | 1/1956 | Hite | 285/286 X |
| 2,971,781 | 2/1961 | Torres | 285/353 X |
| 3,260,539 | 7/1966 | Herron | 285/287 X |

FOREIGN PATENTS

| 462,253 | 11/1913 | France | 285/371 |
| 904,566 | 8/1962 | Great Britain | 285/353 |

*Primary Examiner*—Dave W. Arola

ABSTRACT: Relates to a leaktight coupling having a dual capability of joining two lines together in either an easily demountable relationship or a relatively permanent relationship. Includes flanged tubular members, axially aligned with their flanges adjacent, and a sealing member disposed between said flanges. To connect two lines in a demountable relationship, one line is permanently secured to one tubular member, the other line being passed through the other tubular member, through the sealing member, and partially into the first tubular member, the sealing member holding the second line in place. To connect two lines in a permanent relationship, the lines are permanently secured to respective ones of the tubular members, and the ends of a sleeve carrying the sealing member extend respectively into the tubular members. In either use, a clamping device draws the flanged tubular members together.

PATENTED NOV 9 1971　　　　　　　　　　　3,618,987

INVENTOR
MARTIN R. CARBONE

By　Adams & Ferguson
　　ATTORNEYS

LEAK-TIGHT COUPLING

This is a continuation of application Ser. No. 698,346, filed Jan. 16, 1968, now abandoned.

This invention relates to leaktight couplings, and more particularly to leaktight couplings for joining tubular lines together and which can be used to effect either relatively permanent or easily demountable connections between such lines.

In vacuum or pressure systems, such as in a laboratory or the like, it is often required to connect two tubular lines in either a so-called relatively permanent relationship or in an easily demountable relationship. The term "permanent" refers to that situation where a different part of the coupling employed to connect the lines is permanently secured to each of the lines, while permitting disengagement of the lines when desired. Whereas, in the "easily demountable" situation, the coupling is permanently secured to only one of the lines, thereby permitting any of a number of other lines to be easily joined thereby.

Heretofore, it was necessary to maintain inventories of two kinds of couplings for the various sizes of lines ordinarily employed in a laboratory in order to be able to selectively make the above-mentioned two types of connections. Furthermore, in systems using corrosive, reactive, easily contaminated fluids (liquids or gasses), or the like, it is necessary to make the couplings out of stainless steel, or some other highly corrosion-resistant material. The necessity of inventorying two sets of couplings for each line size, and the relatively high cost of making such couplings out of corrosion-resistant materials, contribute to a large expense for laboratory couplings.

Thus, there is a need for a relatively inexpensive coupling, which can serve the dual function of effecting either a relatively permanent or easily demountable connection between two lines while maintaining a high degree of vacuum or pressure tightness.

Accordingly, it is a general object of this invention to provide leaktight couplings which overcome the above-described problems and disadvantages associated with conventional couplings.

Another object is to provide couplings of the type described which can effect either a relatively permanent or easily demountable connection between two lines while maintaining a high degree of vacuum or pressure tightness. A related object is to provide such couplings which are relatively inexpensive to manufacture.

Another object is to provide couplings of the type described, which require no special tools to assemble and which can be hand assembled to obtain mass spectrometer leak detection standards.

Broadly considered, a coupling according to the invention, includes first and second tubular members which are flanged respectively on one end, are axially aligned so that the flanges are adjacent, and have inside diameters dimensioned to accommodate respective ones of a pair of lines. The coupling also includes a tubular sleeve of relatively short length dimensioned to engage the inside of the tubular members in a sliding fit relationship. A resilient annular sealing member surrounds the sleeve and is supported thereby, and a drawing device is employed to pull the flanges together.

When used as a permanent-type coupling, the respective lines are inserted into respective ones of the tubulars members from the unflanged ends thereof, and permanently secured to the respective tubular members. With the sealing member surrounding the sleeve and disposed between the flanges of the adjacent tubular members, the respective ends of the sleeve are inserted into respective ones of the tubular members. The drawing device is then operated to draw the flanges together so that leaktight seal is effected between the sealing member and the flanges.

When used as an easily demountable coupling, only one of the tubular members is permanently secured to a respective one of the lines and the sleeve is not used. The other line is inserted through the second tubular member and the sealing member, and then partially into the first tubular member, the sealing member being disposed between the flanges. The drawing device is then operated to draw the flanges together, so that a leaktight seal is effected between the sealing member, and the flanges and the inserted line.

In either case, the fluid (or vacuum) in the lines only contacts the interior of the tubular members and the sealing member, and in the case of the permanent-type connection the fluid additionally contacts the interior of the sleeve.

Figure 2:
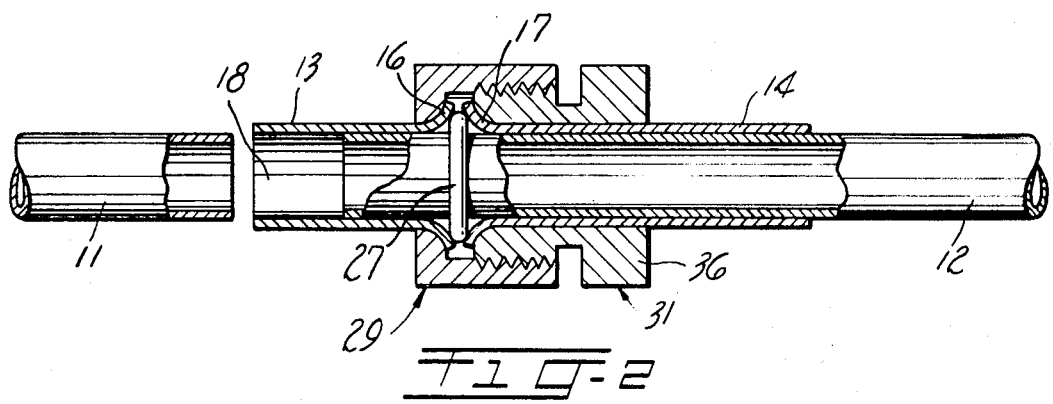

In order that the manner in which the foregoing and other objects are attained in accordance with the invention, can be understood in detail, a particularly advantageous embodiment thereof will be described with reference to the accompanying drawings, which form a part of this specification, wherein:

FIG. 1 is a schematic diagram of a coupling according to the invention illustratively shown as connecting a pair of lines in a relatively permanent type relationship, and FIG. 2 is a schematic diagram of a coupling illustratively shown as connecting a pair of lines in an easily demountable-type relationship.

In FIG. 1, a coupling 10, according to the invention, is illustratively shown as arranged to connect first and second laboratory or other type lines, 11 and 12 respectively, in a relatively permanent-type relationship.

Coupling 10 includes first and second tubular members, 13 and 14 respectively, each having an out-turned annular flanged portion, 16 and 17 respectively, and an opposite unflanged smooth end, 18 and 19 respectively. Each of the tubular members has an inner diameter substantially equal to the outer diameter of the laboratory lines, so that the lines can be inserted into the respective tubular members in a tight but slidable relationship.

A relatively short tubular member or sleeve 26 has an outer diameter substantially equal to the inner diameter of the tubular members, and can be inserted into the tubular members in a tight but slidable relationship. Surrounding sleeve 26, in an interference fit relationship, is resilient O-ring 27 made of a material which is relatively inert with regard to the material in the lines. O-ring 27 can have any suitable cross-sectional shape.

When coupling 10 is assembled as shown in FIG. 1, tubular members 11 and 12 are axially aligned so that flanged portions 16 and 17 are disposed in adjacent, but slightly spaced relationship. Sleeve 26 is disposed so that the respective ends of it extend respectively beyond each of the flanged portions and partially within the tubular members, with O-ring being disposed between flanged portions 16 and 17.

A clamping device 28, including a cap member 29 and a body member 31, is provided for drawing flanged portions 16 and 17 together. Cap member 29 is a nut-type member having an end portion 32 with an opening 33 therein sufficiently large to slide over tubular member 13 but not large enough to pass over flanged portion 16, the cap member being provided with internal female threads. Body member 31 is a tubular sleeve-type member having a bore 34 sufficiently large to slide over tubular member 14 but not large enough to pass over flanged portion 17. Body member 31 is provided with a head member 36 and with external threads which engage those of cap member 29. It will be understood that the above-described clamping device is merely illustrative of a variety of such clamping devices.

To employ the coupling of this invention to connect lines 11 and 12 in a relatively permanent-type relationship, the unflanged end 18 of tubular member 13 is passed through opening 33 in cap member 29 so that flanged portion 16 is contained within the recess of the cap member. The unflanged end 19 of tubular member 14 is passed through bore 34 of body member 31 so that flanged portion 17 is relatively remote from head portion 36 of the body member.

Line 11 is then inserted partially into tubular member 13 and permanently secured thereto, as by brazing, welding, soldering, or the like, depending on the materials of the line and the tubular member. Line 12 is inserted into and secured to tubular member 13 in like fashion.

Flanged portions 16 and 17 are brought into axial alignment in proximity of each other, so that sleeve 26 with O-ring 27 disposed thereon approximately in the center thereof, can be inserted partially into each of the tubular members. Head portion 36 of body member 31 is rotated relative to cap member 29 so that the threads of these members interengage to draw the flanged portions toward each other to compress the O-ring therebetween, thereby, effecting an extremely high leaktight seal between the O-ring and the flanged portions of the lines.

When lines 11 and 12 are connected by coupling 10, as above-described, they are connected in a leakproof relationship with respect to pressure and vacuum. Such connection can be achieved by hand assembly of the coupling without the use of special tools, and the connection can be hand disassembled in like manner so that lines 11 and 12 can be connected to other lines.

While the coupling of the invention has been described in terms of connecting laboratory lines together, it will be apparent to those skilled in this art that the coupling can be readily used to connect various kinds of lines, conduits, pipes, and the like, in laboratory and other situations where leaktight conditions must be maintained.

Where the lines carry corrosive, reactive, or easily contaminated materials, the lines are usually made of corrosion resistant material, such as stainless steel, such corrosion resistant materials being relatively expensive. In this situation, the tubular members and the sleeve can be made of stainless steel and the cap member and body member which require extensive machining can be made of stainless steel and the cap member and body member which require extensive machining can be made of a less expensive material, such as brass, thereby realizing substantial savings over prior art coupling for use in systems carrying corrosive materials wherein all of the parts including the cap and body members were usually made of stainless steel.

While the respective parts of the coupling, except the O-ring have been described as being made of stainless steel and brass, it will be apparent that the coupling can be made of other materials including plastics, glasses, and other metals, depending on the material out of which the lines to be coupled are made and the application of the system.

Leaktight couplings according to the invention have been manufactured for laboratory use in coupling lines ranging from one-quarter to 1 inch diameters, and have been used successfully to achieve leaktight seals to mass spectrometer leak detection standards. It will be apparent that the principles of the invention can be applied to other sizes of lines.

In FIG. 2, the coupling of the invention is illustratively shown as connecting lines 11 and 12 in an easily demountable type of relationship.

To connect lines 11 and 12 in an easily demountable relationship, tubular member 13 is passed through the opening in cap member 29 and tubular member 14 is passed through the opening in body member 31 as described in connection with FIG. 1. Line 11 is then inserted partially into tubular member 13 from the unflanged end 18 and permanently secured thereto, as by welding, brazing, or the like. Line 12 is passed entirely through tubular member 14 and beyond flanged portion 17 and then through O-ring 27. That portion of line 12 extending beyond flanged portion 17 is inserted into tubular member 13, from the flanged end so that O-ring 27 is disposed between the flanged portions 16 and 17 of the now axially aligned tubular members 13 and 14.

Cap member 29 and head member 36 are now hand operated as previously described, so that the O-ring is compressed between flanges 16 and 17 to achieve an extremely high, leaktight seal between the O-ring and flanged portions of the lines, and thus between lines 11 and 12.

When the coupling is used in the easily demountable mode, only one of the tubular members is permanently secured to one of the lines and the sleeve is not employed. With this arrangement, line 11, having tubular member 13 permanently connected thereto, can be selectively, quickly and easily connected to any of a number of other lines 12.

It will be apparent to those skilled in this art, that the coupling of the invention readily serves the dual use of connecting lines both in relatively permanent relationship and in easily demountable relationship, thereby eliminating the need of storing two separate types of coupling to perform these two functions as was heretofore necessary.

I claim:

1. A coupling for connecting two tubular lines together, comprising: first and second tubular members, each of said tubular members having a flanged portion on one end thereof, said tubular members being axially aligned with the respective flanged portions adjacent, each of said tubular members having an inner diameter dimensioned to receive respective ones of the lines; an annular resilient sealing member operatively disposed between said adjacent aligned flanged portions; and means for drawing said flanged portions together; said first tubular member adapted to have one of the lines partially inserted thereinto from the unflanged end thereof and to have this line permanently secured thereto, said unflanged end of said first tubular member extending through and axially beyond at least a portion of said drawing means said second tubular member having the second line extending completely therethrough, through said sealing member, and partially into said first tubular member, wherein said sealing member tightly embraces and is supported by the second line, and holds this line in place, said drawing means being operative to draw said flanged portions together to compress said sealing member into high leaktight sealing engagement with said flanged portions and the second line.

2. A coupling for connecting two tubular lines together, comprising and second tubular members, each of said tubular members having a flanged portion on one end thereof, said tubular members being axially aligned with the respective flanged portions adjacent, each of said tubular members having an inner diameter dimensioned to receive respective ones of the lines; an annular resilient sealing member operatively disposed between adjacent aligned flanged portions; means for drawing said flanged portions together; said first tubular member adapted to have one of the lines partially inserted thereinto from the unflanged end thereof and to have this line permanently secured thereto, said second tubular member adapted to have the second line partially inserted thereinto from the unflanged end thereof and to have this line permanently secured thereto; and a sleeve member having a constant outer diameter positioned in and dimensioned to engage the interior of said tubular members in close, free, slidable relationship; wherein said sealing member tightly embraces and is supported by said sleeve member and holds said sleeve in place, said drawing means being operative to draw said flanged portions together to compress said sealing member into high leaktight sealing engagement with said flanged portions and said sleeve.

3. A coupling according to claim 1, wherein said annular sealing member is of uniform cross section.

4. A coupling according to claim 2, wherein said annular sealing member is of uniform cross section.

5. A coupling for connecting first and second tubular lines together, comprising: first and second tubular members; each of said tubular members having a flanged portion on one end thereof, said tubular members being axially aligned with the respective flanged portions adjacent; said second tubular member having an inner diameter dimensioned to receive said second tubular line; an annular resilient sealing member operatively disposed between said adjacent aligned flanged portions; means for drawing the flanged portions together, said first tubular member adapted to have the first tubular line partially inserted thereinto from the unflanged end thereof and to have this line permanently secured to the first tubular member; said unflanged end of said first tubular member extending through and axially beyond at least a portion of said drawing means. said second tubular member adapted to have the second tubular line extend completely therethrough, through said sealing member, and partially into first tubular member; wherein said sealing member tightly embraces and is supported by the second tubular line and holds this line in place, said means for drawing being operative to draw said flanged portions together to compress said sealing member into high leaktight sealing engagement with said flanged portions and the second tubular line.

6. A coupling for connecting first and second tubular lines together, comprising: first and second tubular members; each of said tubular members having a flanged portion on one end thereof, said tubular members being axially aligned with the respective flanged portions adjacent, said second tubular member having an inner diameter dimensioned to receive said second tubular line; an annular resilient sealing member operatively disposed between said adjacent aligned flanged portions; means for drawing said flanged portions together; said first tubular member adapted to have the first tubular line partially inserted thereinto from the unflanged end thereof and to have this line permanently secured to the first tubular member; said second tubular member adapted to have said second tubular line partially inserted thereinto from the end opposite said flanged portion and to have this tubular line permanently secured thereto; a sleeve member having a constant outer diameter dimensioned to engage the interior of said tubular members in close, free, slidable relationship; wherein said sealing member tightly embraces and is supported by said sleeve members and holds said sleeve in place, said drawing means being operative to draw said flanged portions together to compress said sealing member into high, leaktight sealing engagement with said flanged portions and said sleeve.

* * * * *